United States Patent

Newnham et al.

[11] Patent Number: 5,276,657
[45] Date of Patent: * Jan. 4, 1994

[54] METAL-ELECTROACTIVE CERAMIC COMPOSITE ACTUATORS

[75] Inventors: Robert E. Newnham; Qichang C. Xu, both of State College; Shoko Yoshikawa, Bellefonte, all of Pa.

[73] Assignee: The Pennsylvania Research Corporation, University Park, Pa.

[*] Notice: The portion of the term of this patent subsequent to Mar. 12, 2008 has been disclaimed.

[21] Appl. No.: 835,245

[22] Filed: Feb. 12, 1992

[51] Int. Cl.$^5$ .................................................. H04R 17/00
[52] U.S. Cl. ........................................ 367/157; 367/159; 367/163; 310/334; 310/337
[58] Field of Search ................ 310/334, 337; 367/157, 367/158, 159, 161, 163, 165, 174

[56] References Cited

U.S. PATENT DOCUMENTS

| | | | |
|---|---|---|---|
| 2,912,605 | 11/1959 | Tibbetts | 367/163 |
| 3,166,730 | 1/1965 | Brown, Jr. et al. | 367/163 |
| 3,277,433 | 10/1966 | Toulis | 367/155 |
| 4,845,688 | 7/1989 | Butler | 367/174 |
| 4,862,429 | 8/1989 | Rolt | 367/165 |
| 4,922,470 | 5/1990 | McMahon et al. | 367/163 |
| 4,999,819 | 3/1991 | Newnham et al. | 367/157 |

Primary Examiner—J. Woodrow Eldred
Attorney, Agent, or Firm—Thomas J. Monahan

[57] ABSTRACT

The metal-ceramic actuator includes an electroactive substrate having at least a pair of opposed planar surfaces and a determined thickness, with the ceramic substrate being poled in its thickness dimension. Conductive electrodes sandwich the ceramic substrate and are bonded to its planar surfaces. Metal caps, each having a concave cavity bounded by a rim, are bonded to both planar surfaces of the ceramic substrate. A potential is applied to the conductive electrodes to cause an expansion of the ceramic substrate in its thickness dimension and a concomitant contraction in its planar dimensions. The contraction creates a flexure of the metal caps, which flexures are used to actuate another instrumentality.

7 Claims, 4 Drawing Sheets

METAL-ELECTROACTIVE CERAMIC COMPOSITE ACTUATORS

GOVERNMENT SUPPORT

This invention was made with Government support under Grant N00014-89-J-1689 and Contract N00014-86-K-0767 awarded by the U. S. Department of the Navy. The Government has certain rights in the invention.

FIELD OF THE INVENTION

This invention relates to electroactive ceramic devices (piezoelectric, electrostrictive, etc.) and, more particularly, to a metal-ceramic electroactive actuator exhibiting large positional displacements.

BACKGROUND OF THE INVENTION

In recent years, piezoelectric, and electrostrictive ceramics have been used as displacement transducers, precision micropositioners, and for other actuator applications. An important drawback to such devices, however, is the fact that the magnitude of strain in such ceramics is limited to approximately 0.1%. Magnification mechanisms have, therefore, been developed to produce sizeable displacements at low voltages. The two most common types of electroactive ceramic actuators are the multi-layer ceramic actuator with internal electrodes, and the cantilevered bimorph actuator.

A bimorph-type actuator will execute a large bending or "wagging" motion with the application of an AC or DC field. Although such actuators exhibit large displacements (generally on the order of several hundred microns), their generative force and response speeds are not high. Multilayer-actuators exhibit significantly larger generative forces, although their displacement values are limited. For instance, a fifteen millimeter multilayer stack provides a displacement of approximately 10 microns. Such a stack characteristically comprises a lead titanate-lead zirconate (PZT) ceramic or a lead titanate-doped lead magnesium niobate (PMN-PT) type ceramic, having a hundred volts of DC applied. There is a need for an electroactive ceramic actuator to provide sizeable displacements with sufficient force to carry out actuator applications.

In U.S. Pat. No. 4,999,819 the inventors hereof previously described an acoustic transducer, of sandwich construction, that was particularly useful for the transformation of hydrostatic pressures to electrical signals. A pair of metal plates were positioned to sandwich a piezoelectric element, with each plate having a cavity formed adjacent to the piezoelectric element. The plates were bonded to the piezoelectric element to provide a unitary structure. The cavities provided a stress-transforming capability which amplified an incoming compressive stress and converted it to a radial extensional stress in the ceramic. The ceramic was generally poled in the thickness dimension and exhibited $d_{33}$, $d_{31}$ and $d_{32}$ piezoelectric coefficients.

As is known to those skilled in the art, the $d_{33}$ coefficient lies in the plane of a ceramic's poling, whereas the $d_{31}$ and $d_{32}$ coefficients describe the action of the ceramic in a plane that is orthogonal to the direction of poling. In the transducer shown in the '819 patent, the cavities transform most of an incoming stress in the $d_{33}$ direction to the $d_{31}$ and $d_{32}$ directions in the piezoelectric slab. By monitoring the voltage generated across the slab, the resulting pressure wave was sensed. There is no indication in U.S. Pat. No. 4,999,819 of the application or use of the aforedescribed structure for actuation purposes.

Accordingly, it is an object of this invention to provide an improved electroactive, metal-ceramic actuator.

It is another object of this invention to provide a metal-ceramic actuator which exhibits substantially improved actuation distances.

It is another object of this invention to provide a metal-ceramic electroactive actuator of inexpensive design.

SUMMARY OF THE INVENTION

The metal-ceramic actuator includes an electroactive substrate having at least a pair of opposed planar surfaces and a determined thickness, with the ceramic substrate being poled in its thickness dimension. Conductive electrodes sandwich the ceramic substrate and are bonded to its planar surfaces. Metal caps, each having a concave cavity bounded by a rim, are bonded to both planar surfaces of the ceramic substrate. A potential is applied to the conductive electrodes to cause an expansion of the ceramic substrate in its thickness dimension and a concomitant contraction in its planar dimensions. The contraction creates a flexure of the metal caps, which flexures are used to actuate another instrumentality.

DETAILED DESCRIPTION OF THE INVENTION

Figure 1:
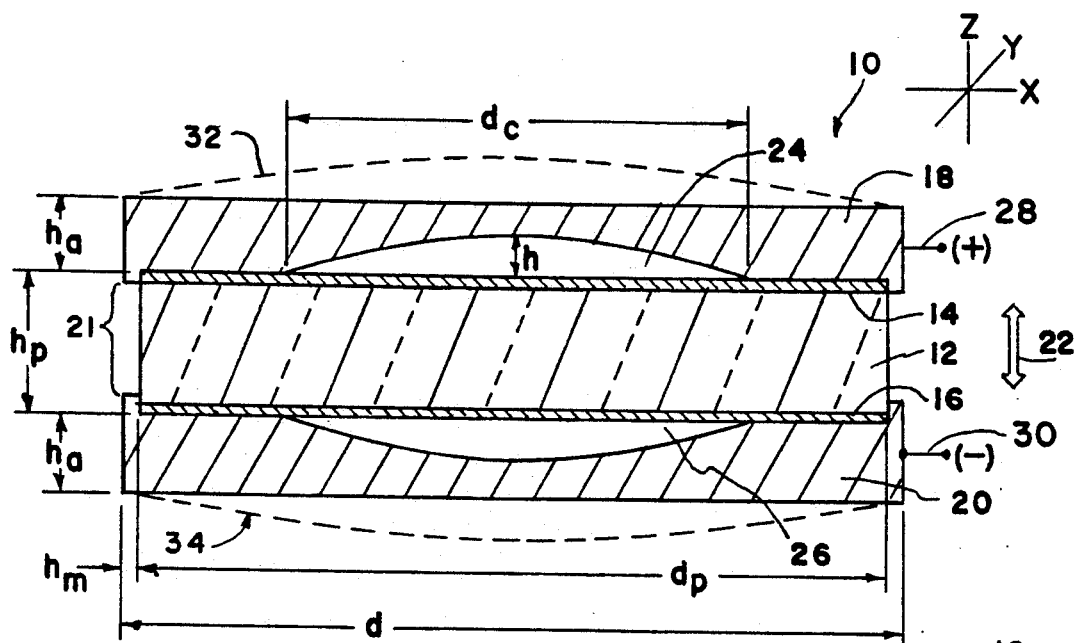
FIG. 1 is a side sectional view of an actuator embodying the invention.
Figure 2:
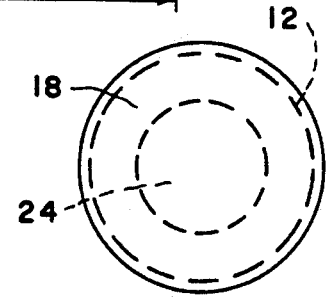
FIG. 2 is a plan view of the actuator of FIG. 1.

Referring to FIGS. 1 and 2, actuator 10 includes a piezoelectric or electrostrictive ceramic disk 12, having conductive electrodes 14 and 16 bonded to its major surfaces. A pair of conductive metal end caps 18 and 20 are bonded to conductive electrodes 14 and 16, respectively. Each end cap is provided with a small lip 21 that extends over the ends of disk 12. In FIG. 2, a plan view is shown of the actuator structure.

If ceramic disk 12 is a piezoelectric material, it is poled, during manufacture, in the directions indicated by arrows 22. If ceramic disk 12 exhibits electrostrictive effects, then it need not be poled.

End caps 18 and 20 are provided with cavities 24 and 26 respectively, so that only the rims that surround the cavities are bonded to ceramic disk 12 and make connection to conductors 14 and 16. A pair of terminals 28 and 30 are connected to end caps 18 and 20, respectively, and provide input conductors for enabling operation of actuator 10.

When a potential is applied across terminals 28 and 30, ceramic disk 12 expands in the z dimension ($d_{33}$). At the same time, it contracts in the x and y dimensions and ($d_{32}$ and $d_{31}$), causing end caps 18 and 20 to bow outwardly, as shown by dotted lines 32 and 34, respectively. The bowing action amplifies the actuation distances created by the contraction of ceramic disk 12, and enables the use of the structure as an actuator.

The stress transformation created by the configuration shown in FIG. 1 substantially magnifies the motion of ceramic disk 12's z direction motion. The displacement of each end cap is 10 times larger than that of the ceramic disk alone and exerts a large generative force. The specific values of the displacement and generative force depend on the actuator's design, the diameters of cavities 24 and 26, the depth of the cavities, the thickness and material of end caps 18 and 20, and the thickness of ceramic disk 12.

Piezoelectric actuator materials that are used with the structures shown and described herein are based primarily on the lead zirconate titanate (PZT) family including PLZT$((PbLa)(Zr,Ti)O_3)$. Electrostrictive ceramic disks utilize lead magnesium niobate (PMN)-based ceramics. Lead titanate-modified PMN (PMN-PT) is preferred.

Various compositional modifications may also be made in the aforesaid materials.

Metal end caps 18 and 20 may be any metallic material with high conductivity and high modulus. Brass, copper and aluminum are representative materials that are suitable. Requirements of the bonding material which connect end caps 18 and 20 to ceramic disk 12 are strong mechanical bonding between metal and ceramic as well as good electrical conductivity. Examples of such materials are a glass flux containing silver paste, metal mesh with epoxy, very thin layer epoxy solder or active metal brazing alloys.

Figure 3:
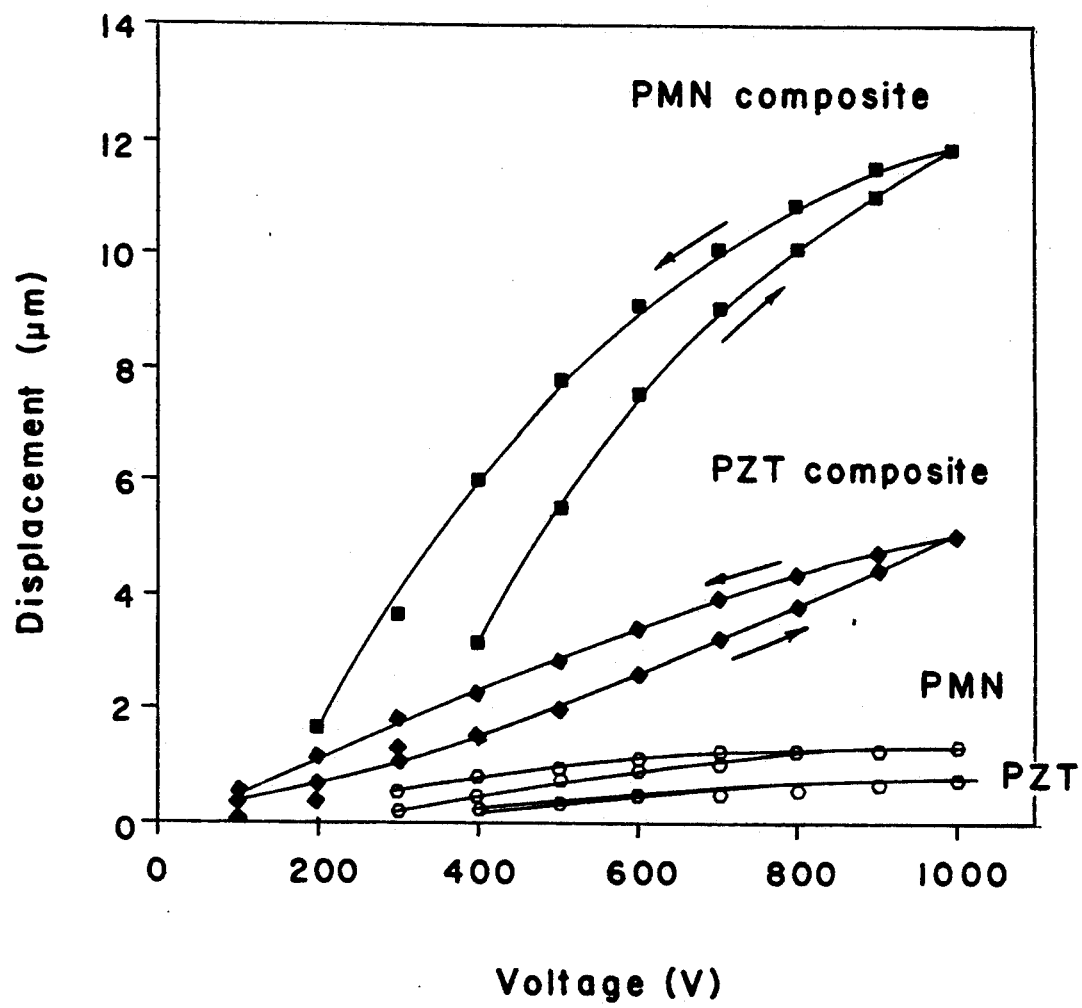
FIG. 3 is a chart showing plots of displacement versus voltage for ceramic actuators constructed in accordance with prior art and actuators constructed in accordance with the invention.

Referring now to the chart shown in FIG. 3, displacements measured for composite actuators driven by PZT and PMN ceramics are plotted versus voltage. Displacements for uncapped PZT and PMN ceramics are shown for comparison. As shown, displacements larger than 10 microns were obtained with a PMN actuator having brass end caps. A corresponding curve for a composite actuator containing PZT shows a five micron displacement. Ceramic displacements without end caps were on the order of one micron.

As above indicated, one actuator whose performance is plotted in FIG. 3 was a PMN-PT disk, end capped with brass disks. Dimensions of this sample were as follows (using the dimensions shown in FIG. 1).

d=13 mm; dc=6 mm; h=150microns; dp=11 mm; hp=1 mm; and hm=0.4 mm.

The applied electric field was 1 kilovolt per millimeter, and produced a 10 micron displacement. It is to be noted that each of the plots in FIG. 3 shows some hysteresis which should be taken into account in the design of the actuator.

A PZT 501 disk, end capped with brass disks produced a 9.6 micron displacement at one kilovolt per millimeter applied voltage. The dimensions of that sample were as follows: d=11 mm; dp=11 mm; dc=7 mm; hp=1 mm; h=50 microns; and hm=0.5 mm.

Figure 4:
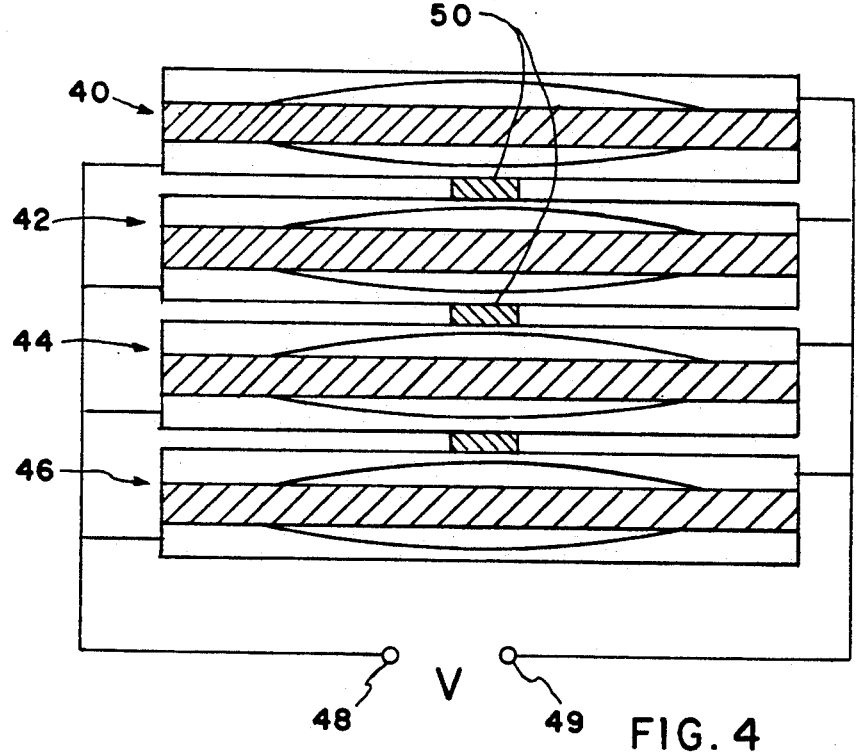
FIG. 4 is an actuator that employs a plurality of the actuators shown in FIG. 1.

Referring now to FIG. 4, a stacked actuator arrangement is shown comprising a plurality of individual actuators 40, 42, 44 and 46, all of which are activated in parallel by a voltage supply applied to terminals 48 and 49. Separators 50 enable the displacement of one actuator to be transmitted to an adjacent actuator. Thus, the respective displacements are additive and provide a total displacement that is a multiple of a single transducer.

Figure 5:
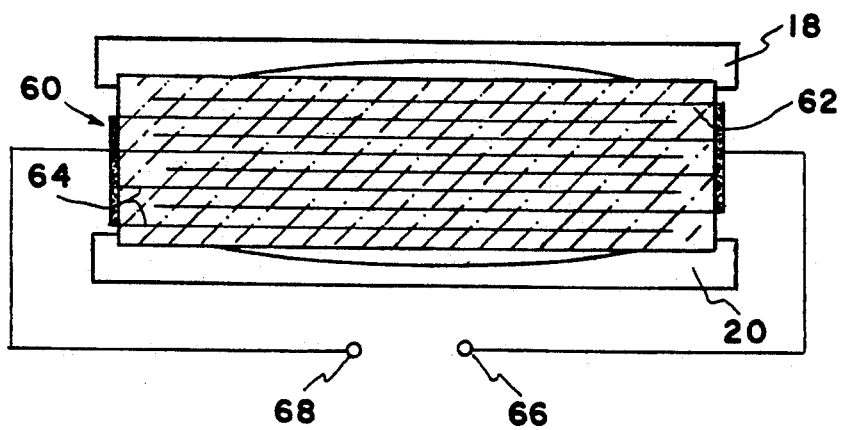
FIG. 5 is a sectional view of an actuator embodying the invention, which actuator employs segmented ceramic electroactive slabs with interspersed electrodes.

Turning to FIG. 5, the structure shown in FIG. 1 has been modified to employ a multilayer ceramic part 60. Ceramic part 60 comprises a plurality of ceramic layers having interdigitated electrodes 62 and 64. Electrodes 62 are connected to terminal 66 whereas electrodes 64 are connected to terminal 68. By utilizing this arrangement, the voltage applied across electrodes 66 and 68 can be reduced in value while still achieving a desired voltage per millimeter value. The operation of the actuator of FIG. 5 is in other respects, identical to that shown in FIG. 1.

Figure 6:
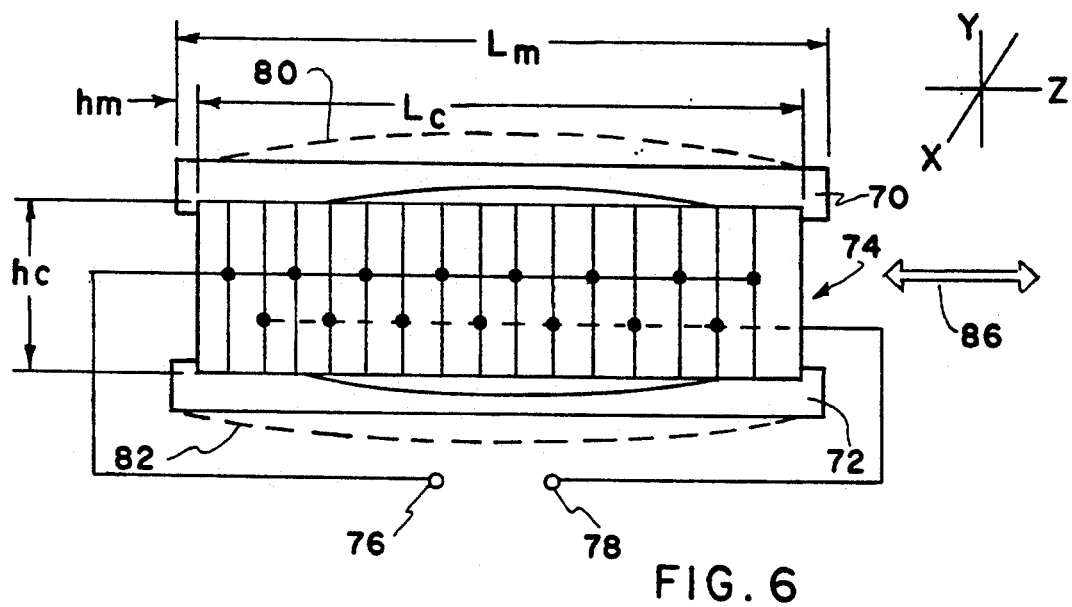
FIG. 6 is another actuator embodiment constructed in accordance with the invention.
Figure 7:
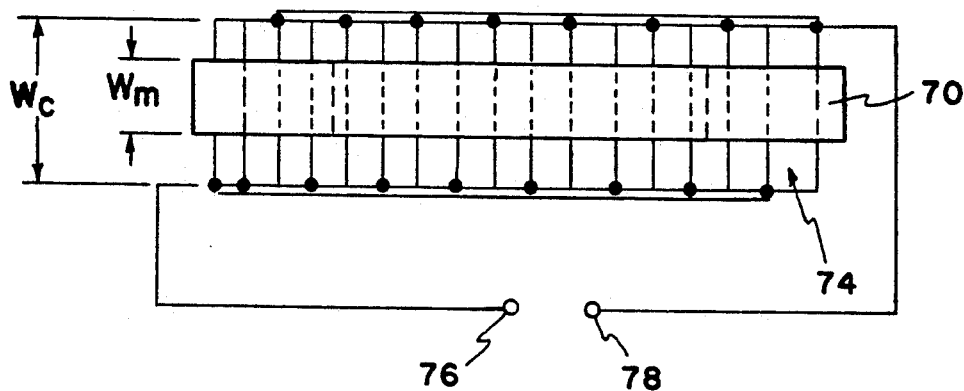
FIG. 7 is a plan view of the actuator of FIG. 6.

Turning now to FIGS. 6 and 7, a further preferred arrangement of the invention is shown. In this case, end caps 70 and 72 sandwich ceramic actuator 74, which actuator is oriented so that its $d_{33}$ poled direction is parallel to the planar dimensions of end caps 70 and 72. Ceramic actuator 74 is multilayered, as shown in FIG. 5. Similarly, it comprises a plurality of interdigitated conductive layers with interspersed ceramic layers.

When the actuator of FIG. 6 and 7 is initially constructed, end caps 70 and 72 are constructed so that their overall length is longer than ceramic part 74. Then, when end caps 70 and 72 are bonded to ceramic part 74, they are bonded in a bowed fashion as shown by dotted lines 80 and 82. When, a potential is applied across terminals 76 and 78, multilayer ceramic 74 expands in the direction shown by arrow 86 and causes end caps 70 and 72 to become unbowed.

Using the structure shown in FIGS. 6 and 7, a greater than 15 micron displacement was obtained using an applied voltage of 150 volts. The result was obtained with only one metal end cap in place. If end caps are applied to both sides of multilayer ceramic part 74, a greater than 30 micron displacement can be obtained for same applied voltage. Dimensions of the actuator shown in FIG. 6 & 7 were as follows: Lm=21.5 mm; Wm= 6.8 mm; hm=0.5 mm; Lc=20.5 mm; Wc=9.6 mm; hc=9.6 mm; and h=0.3 mm.

EXPERIMENTAL RESULTS

Composite actuators were made from electroded PZT5A disks (11 mms in diameter and 1 mm thick) and brass end caps (13 mm in diameter with thicknesses ranging from 0.4 to 3 mm). Shallow cavities 6 mm in diameter and 150 micron center depth were machined into the inner surface of each brass cap. The PZT disk and the end caps were bonded around the circumference taking care not to fill the cavity or short circuit the ceramic electrodes. Silver foil (25 micron thickness) and silver paste were used as bonding materials. The composite was heated to 600° C. under stress to solidify the bond. After cooling, the actuator was encapsulated using Spurrs epoxy resin, followed by curing at 70° C. for 12 hours. Electrodes were attached to the brass end caps and the ceramic was poled at 2.5 Mv/m for 15 minutes in an oil bath held at 120° C.

The direct piezoelectric coefficient was measured at a frequency of 100 Hz using a Berlincourt $d_{33}$ meter. The converse piezoelectric coefficient of the ceramic was determined with a laser interferometer. Displacements of the composite actuator were measured with a linear voltage differential transducer having a resolution of approximately 0.05 microns. The effective $d_{33}$ coefficient of a composite was obtained by dividing the strain by the applied electric field. In comparing the resulting $d_{33}$ with that of a ceramic, the total thickness of the composite was employed in calculating the field-induced strain. Resonant frequencies were obtained with a Hewlett Packard L. F. Impedance Analyzer Number 4192A.

Figure 8:
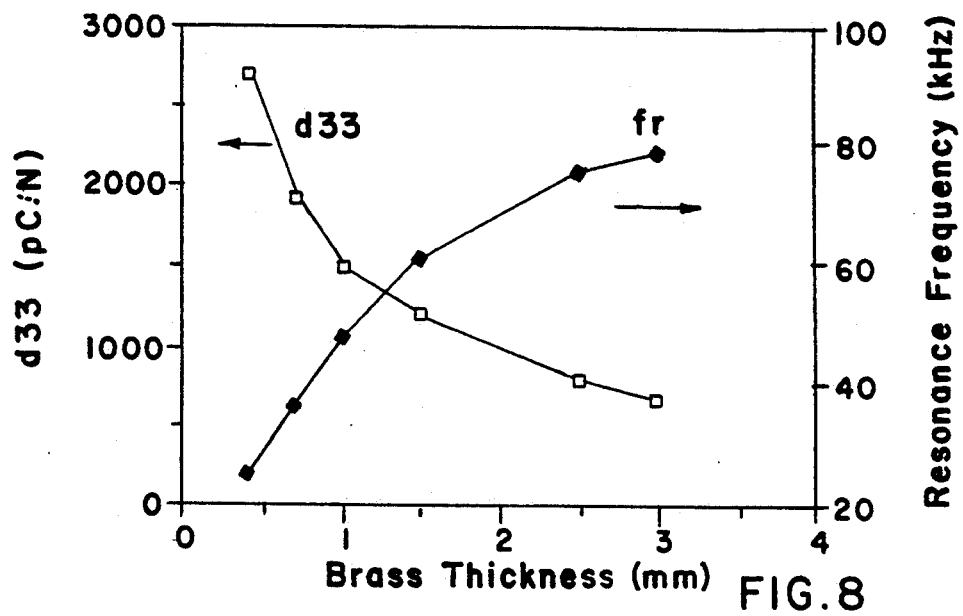
FIG. 8 shows the $d_{33}$ coefficient and resonant frequency plotted as a function of cap thickness.

FIG. 8 shows the $d_{33}$ coefficient and resonant frequency plotted as a function of brass cap thickness. As expected, thinner end caps flexed easier, resulting in larger piezoelectric coefficients. The $d_{33}$ values were measured at the center of the brass end caps using a Berlincourt $d_{33}$ meter. Values as high as 2500 pC/N were obtained, approximately five times that of PZT 5A alone. The fundamental flextensional resonant frequency decreased rapidly with decreasing brass thickness, dropping to less than 20kHz for a thickness of 0.4 mm.

Figure 9:
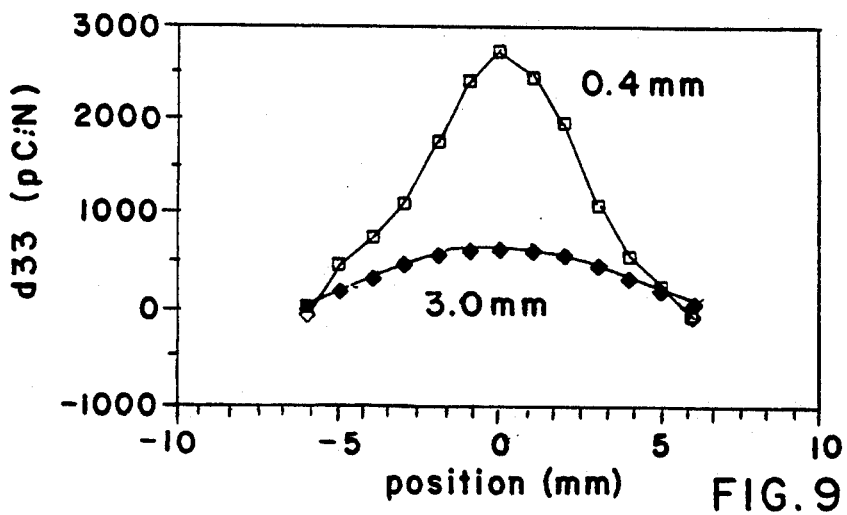
FIG. 9 shows the positional dependance of the $d_{33}$ coefficient for two actuators with cap thicknesses of 0 4 mm and 0.3 mm.

Piezoelectric effects were largest near the center of the transducer, where the flexural motion was largest. The $d_{33}$ values as a function of position are shown in FIG. 9. Plots are shown for two brass thicknesses of 0.4 and 3.0 mm respectively. Ample working area of several square millimeters was obtained with the actuators.

Figure 10:
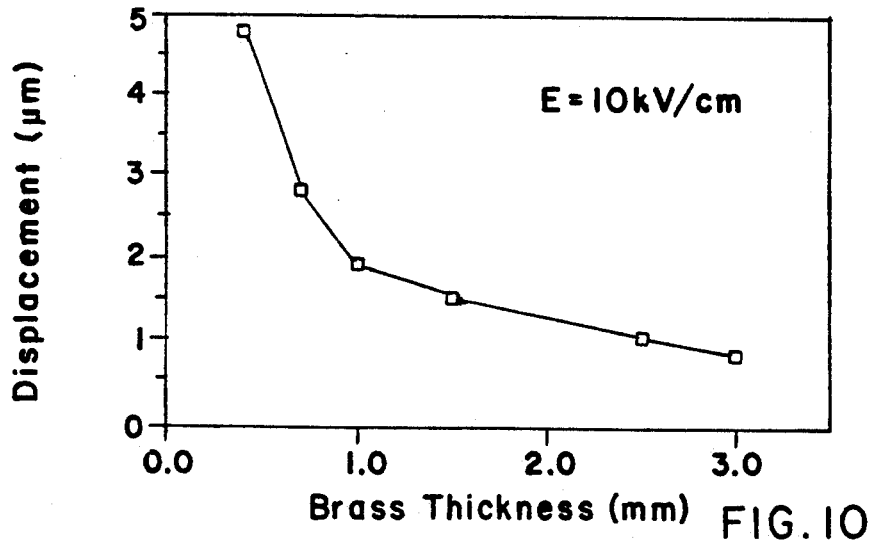
FIG. 10 shows a plot of maximum displacement as a function of cap thickness.

Maximum displacements obtained with a single brass end cap on an actuator are shown in FIG. 10. The values were recorded with the LVDT system in a field of 1 MV/m which is well below the breakdown field of PZT. The largest displacements were obtained with actuators having thin end caps. It was determined that even thin end caps are capable of exerting forces in excess of 2 kgf. Experiments were also carried out with actuators incorporating PMN ceramics. As mentioned above, PMN does not need to be poled because it utilizes the electrostrictive effect rather than piezoelectric electricity. The PMN composite actuator results are plotted in FIG. 3.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:
1. An actuator comprising:
circular electroactive ceramic substrate means having a pair of opposed planar surfaces and a thickness aspect, said substrate means having a $d_{33}$ direction parallel to said thickness aspect and $d_{31}$ and $d_{32}$ directions parallel to said planar surfaces;
conductive electrodes sandwiching said ceramic substrate means and covering said opposed planar surfaces;
a first metal cap having a concave cavity formed therein and exhibiting a continuous rim bounding said cavity, said rim bonded about its entire surface to said conductive electrode on a first said planar surface of said ceramic substrate means;
a second metal cap having a concave cavity formed therein and exhibiting a continuous rim bounding said cavity, said rim bonded about its entire surface to said conductive electrode on a second planar surface of said ceramic substrate means, said second planar surface opposed to said first planar surface; and
means for applying a potential across said conductive electrodes to enable a field in the $d_{33}$ direction that causes a contraction of said ceramic substrate means in the $d_{31}$ and $d_{32}$ directions, and through said bonded rims, a flexure of said metal caps.

2. The actuator of claim 1 wherein said electroactive ceramic substrate is poled along with $d_{33}$ direction and exhibits a piezoelectric characteristic.

3. The actuator of claim 2 wherein said potential is applied to said metal caps.

4. The actuator of claim 1 wherein said electroactive ceramic substrate means exhibits an electrostrictive characteristic.

5. The actuator of claim 1 wherein said electroactive ceramic substrate means comprises a stack of ceramic substrates, with conductive electrodes positioned therebetween, said means for applying a potential connecting one potential to every other conductive electrode and connecting another potential to conductive electrodes not connected to said one potential.

6. The actuator of claim 5 wherein said ceramic substrates and conductive electrodes lie in planes that are parallel to said conductive electrodes.

7. An actuator comprising a plurality of actuators, each actuator structured as recited in claim 1, said actuators stacked one upon the other, with insulating means interspaced therebetween, said means for applying a potential connected in parallel to said plurality of actuators.

* * * * *